March 14, 1933.   B. McCANDLESS   1,901,182
PORTABLE DISPLAY SCREEN
Filed Aug. 31, 1931   2 Sheets-Sheet 1
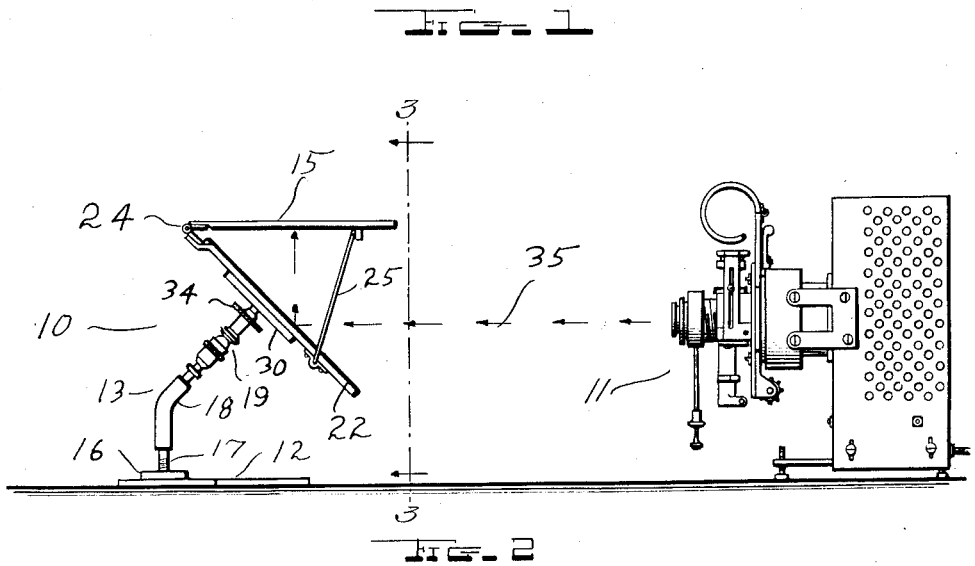
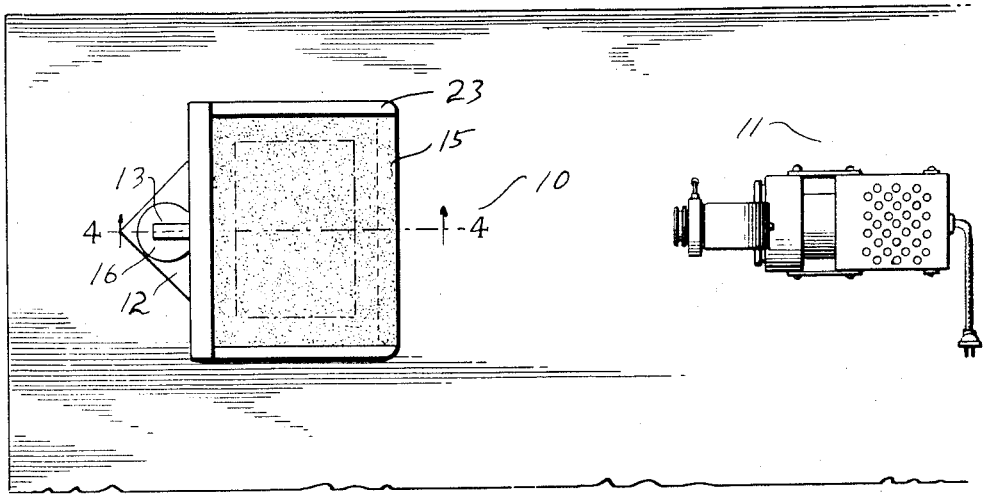
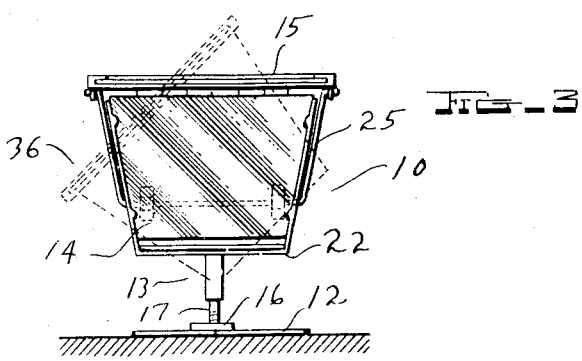
INVENTOR.
Byron McCandless,
BY Robert A. Tenender
ATTORNEY.

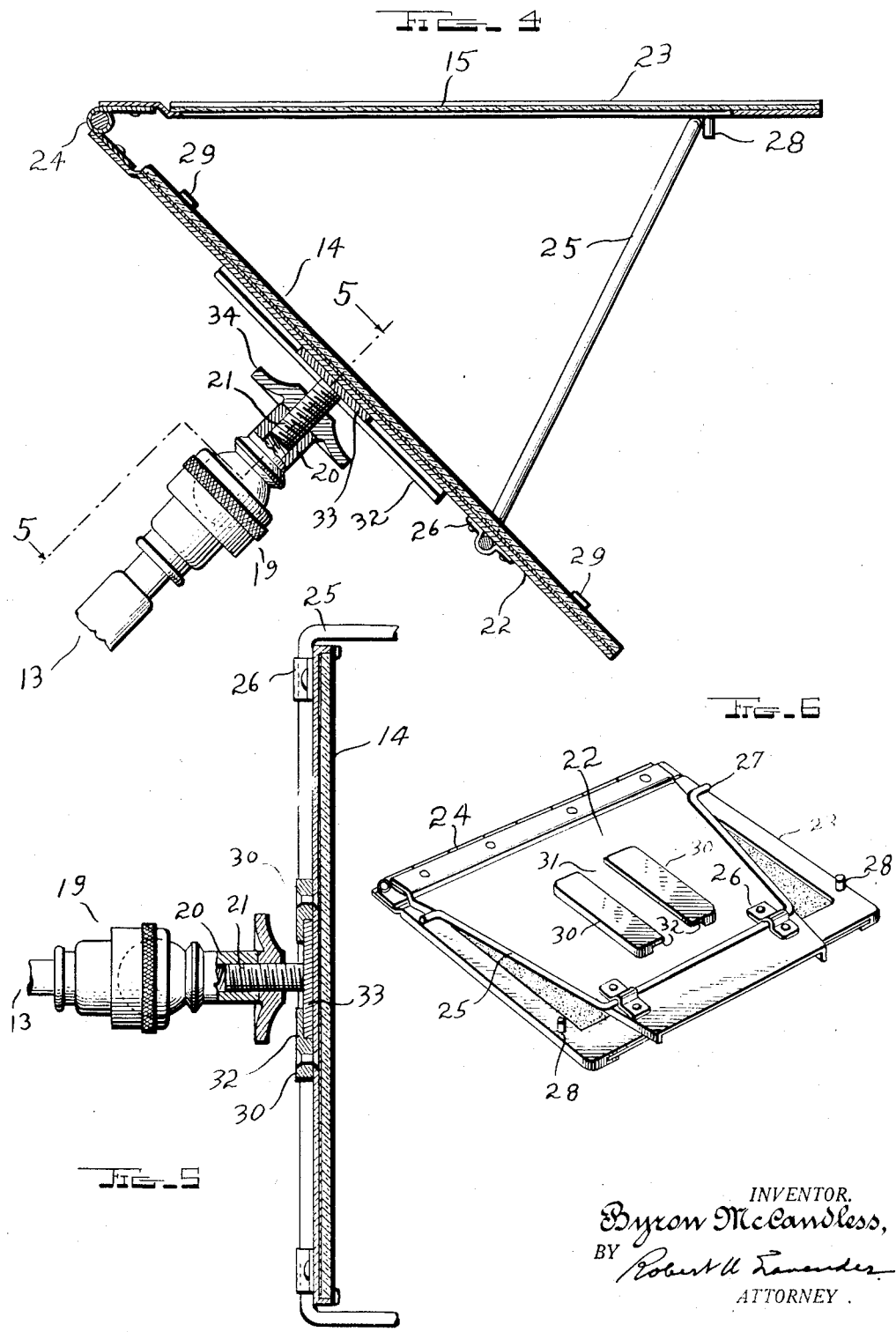

Patented Mar. 14, 1933

1,901,182

UNITED STATES PATENT OFFICE

BYRON McCANDLESS, OF THE UNITED STATES NAVY

PORTABLE DISPLAY SCREEN

Application filed August 31, 1931. Serial No. 560,251.

(GRANTED UNDER THE ACT OF MARCH 3, 1883, AS AMENDED APRIL 30, 1928; 370 O. G. 757)

This invention relates to a portable displaying screen and has for an object to provide an easily portable displaying screen particularly useful by an individual or small group of individuals for observing images projected from a projection apparatus.

A further object of this invention is to provide a portable displaying screen that may be easily assembled and disassembled, and when so disassembled, will occupy a minimum amount of space and can be easily packed in a suitcase or other suitable container.

A further object of this invention is to provide an adjustable displaying screen that may be adjusted at various angles to suitably display the image projected thereon, and may be particularly adjusted to definite angles for a typist or writer to observe the image, either for writing in reference to the image, or for copying the image if the image should include descriptive matter.

A still further object of this invention is to provide a suitable screen for projection apparatus hereinbelow referred to.

With the above and other objects in view, the invention consists in the construction, combination and arrangement of parts as will be described more fully hereinafter.

Reference is to be had to the accompanying drawings forming a part of this specification, in which like reference characters indicate corresponding parts throughout the several views, and in which:

Fig. 1 shows a plan view of this displaying screen set up in its operative position before a suitable projection apparatus;

Fig. 2 is a top plan view of Fig. 1;

Fig. 3 is a view on line 3—3 of Fig. 1;

Fig. 4 is a cross-sectional view of line 4—4 of Fig. 2;

Fig. 5 is a cross-sectional view of line 5—5 of Fig. 4;

Fig. 6 is a perspective view of the screen per se in disassembled and collapsed position.

There is shown at 10 a portable screen in its operative position for displaying an image from a projecting machine indicated at 11. This projecting machine 11 is more particularly shown, described and claimed in a co-pending application executed as of even date herewith and filed Aug. 31, 1931, Serial No. 560,250. Screen 10 comprises the base 12, a supporting arm 13, the reflecting means 14 and the displaying means 15.

The base 12 has a boss 16 projecting up from one corner thereof. This boss 16 and the base 12 are threaded therethrough to admit the threaded end of nipple 17 projecting from elbow 18 forming a part of the supporting arm 13. A ball and socket joint 19 is affixed to the other end of the elbow 18 for permitting adjustability of the supporting arm 13. The ball has a female threaded projection 20 to receive the male threaded stud therein, the displaying means being detachably securable to the stud 21 by means that will be later described.

The assembly for viewing the image comprises a reflecting means 14 and displaying means 15, reflecting means 14 being mounted in a frame 22 and the displaying means 15 being mounted in a frame 23. This pair of frames 22 and 23 are hinged together as at 24 and a U-shaped spacing wire 25 is hingedly secured at 26 to the back of reflecting frame 22. The ends 27 of the spacing wire 25 are turned as shown. A pair of studs 28 are affixed in the displaying frame 23. When in operative position, this spacing wire 25 is turned about until it abuts against the studs 28 thereby holding the displaying frame 23 at the desired predetermined angle to the reflecting frame 22. Reflecting means 14 will preferably consist of a glass mirror held in position thereagainst by means of the turned-over flanges 29, while the displaying means 15 will preferably consist of a ground glass held in the frame 23.

Fixedly secured to the back of the reflecting frame 22 is a pair of channel members 30, one of the channel members being L-shaped and the other being in the shape of a reversed L; these members 30 are spaced somewhat apart. Thus will be seen that an open channel 31 is formed between the channel members 30 and each channel member 30 has an overhanging flange 32. A sliding socket is thus formed by means of the channel members 30 and their overhanging flanges 32 and a substantially rectangular plate 33 may be slidably received beneath the overhanging flanges 32. This plate 33 has affixed therein the threaded male stud 21 above referred to and a nut 34 thereon which may be tightened up so as to hold the plate 33 immovably fixed in the channel 31. When this nut 34 is loosened, the plate 33 will slide along the channel 31 until it passes beyond the end thereof and separates therefrom.

In operation, the displaying screen 10 is set up as shown in Fig. 1, the threaded end 17 being fixed in the base and the plate 33 being fixed in channel 31 and held fixedly in position therein by tightening the nut 34. The arm 25 is turned so that its ends 27 are abutted against studs 28 in displaying frame 23, thus holding the displaying ground glass screen 15 at the proper angle. As shown in Fig. 1, the image light rays 35 travel from the projection machine 11 to the reflecting mirror 14 and are displayed through the ground glass 15. Due to the ball and socket joint 19, the arm 13 is adjustable and hence the mirror 14 and screen 15 may be turned about as desired.

As shown in Fig. 3, in dotted outline 36, the displaying screen may be turned about so that the image thereon may be conveniently observed by a person sitting beside it, as at a typewriter, for the purpose of writing a description of the image displayed or possibly copying the image, if the image be descriptive subject matter.

It will be understood that the above description and accompanying drawings comprehend only the general and preferred embodiment of this invention, and that various changes in construction, proportion and arrangement of parts may be made within the scope of the appended claims, and without sacrificing any of the advantages of this invention.

The herein described invention may be manufactured and used by or for the Government of the United States of America for governmental purposes without the payment of any royalties thereon or therefor.

Having thus set forth and disclosed the nature of this invention, what is claimed is:

1. A portable displaying screen comprising an image reflecting means, an image displaying means, means for supporting said displaying means at a suitable angle to said reflecting means, and means for supporting said reflecting means, said reflecting means supporting means comprising an adjustable arm, a sliding socket for securing said arm to said reflecting means, and a base for detachably supporting said arm.

2. A portable displaying screen comprising an image reflecting means, an image displaying means, means for supporting said displaying means at a suitable angle to said reflecting means, and means for supporting said reflecting means, said reflecting means supporting means comprising a frame, means to secure the reflecting means to the front of said frame, an open socket fixed to the back of said frame, a rectangular plate receivable in said socket, a threaded stud projecting from said plate through the open channel, a nut on said stud to fixedly secure said plate in said socket, an adjustable arm having one end securable to said stud, and a base for the other end of said arm.

3. A portable displaying screen comprising an image reflecting means, an image displaying means, means for supporting said displaying means at a suitable angle to said reflecting means, and means for supporting said reflecting means, said reflecting means supporting means comprising a frame, means to secure the reflecting means to the front of said frame, an open socket fixed to the back of said frame, a rectangular plate receivable in said socket, a threaded stud projecting from said plate through the open channel, a nut on said stud to fixedly secure said plate in said socket, an adjustable arm having one end securable to said stud, a ball and socket joint in said arm and an elbow in said arm, a threaded projection on the other end of said arm, a base, a boss secured to said base near one edge thereof, said base and boss having a threaded opening therethrough, said opening being adapted to receive and support the threaded end of said arm.

4. A portable displaying screen comprising a pair of frames, a common hinge securing said frames together, a ground glass secured in one frame for displaying the image, a reflecting means secured in the other frame for receiving the image and reflecting it to said ground glass, spacing means comprising a U-shaped arm hinged to the back of the reflecting frame, a pair of studs on said displaying frame, the free ends of the U being adapted to abut against said studs to hold said frames at the proper angle to each other, and means for adjustably supporting said screen, said supporting means being easily attachable to and detachable from said screen.

BYRON McCANDLESS.